United States Patent
Williams

(10) Patent No.: US 8,713,363 B2
(45) Date of Patent: Apr. 29, 2014

(54) POWER SUPPLY SYSTEM FOR A DATA STORAGE SYSTEM AND A METHOD OF CONTROLLING A POWER SUPPLY

(75) Inventor: Tim Williams, Havant (GB)

(73) Assignee: Xyratex Technology Limited, Havant (GB)

(*) Notice: Subject to any disclaimer, the term of this patent is extended or adjusted under 35 U.S.C. 154(b) by 676 days.

(21) Appl. No.: 12/893,749

(22) Filed: Sep. 29, 2010

(65) Prior Publication Data

US 2012/0079321 A1    Mar. 29, 2012

(51) Int. Cl.
*G06F 11/00*    (2006.01)

(52) U.S. Cl.
USPC ............ 714/14; 714/22; 714/25; 307/66; 307/127; 307/71; 324/427; 324/433; 324/429; 700/286; 700/292; 700/293; 700/294

(58) Field of Classification Search
USPC .......... 324/427, 433, 429; 307/66, 127, 71; 714/25, 14; 700/286, 292–294
See application file for complete search history.

(56) References Cited

U.S. PATENT DOCUMENTS

| | | | | |
|---|---|---|---|---|
| 4,675,538 A * | 6/1987 | Epstein | ............. | 307/64 |
| 4,922,184 A * | 5/1990 | Rosenstein et al. | ........... | 324/72.5 |
| 2005/0162019 A1* | 7/2005 | Masciarelli et al. | ............. | 307/66 |
| 2008/0157601 A1* | 7/2008 | Masciarelli et al. | ............. | 307/66 |
| 2008/0320322 A1* | 12/2008 | Green et al. | ................... | 713/340 |
| 2010/0052426 A1 | 3/2010 | Carter et al. | .................... | 307/64 |

OTHER PUBLICATIONS

Davis et al., U.S. Appl. No. 61/245,466, filed Sep. 24, 2009.

* cited by examiner

*Primary Examiner* — Joshua P Lottich
*Assistant Examiner* — Jeison C Arcos
(74) *Attorney, Agent, or Firm* — Pillsbury Winthrop Shaw Pittman LLP

(57) ABSTRACT

The invention provides a power supply system for a data storage system, the power supply system comprising: a first power supply unit for supplying power to the storage system; a second power supply unit independent from the first power supply unit for supplying power to the storage system; an auxiliary power supply; a power redundancy controller, arranged to monitor the region of an efficiency curve within which the first and/or second power supplies are operating in and control the first and second power supplies accordingly such that the either or both of the first and second power supplies are providing power at any one time, wherein in the event of failure of a power supply unit when only one of the power supply units is operating, the power redundancy controller is arranged to provide power supply to the data storage system from the auxiliary power supply.

12 Claims, 7 Drawing Sheets

POWER SUPPLY SYSTEM FOR A DATA STORAGE SYSTEM AND A METHOD OF CONTROLLING A POWER SUPPLY

The present invention relates to a power supply system for a data storage system and a method of controlling the power supply of a data storage system.

In general a data storage system is a system having one or more data storage media such as hard disk drives, together with associated components such as input/output units, controllers etc. Typically, data storage systems may comprise plural data storage media such as hard disk drives or solid state memory devices connected via a midplane to one or more input/output units. The input/output units are themselves connected to hosts and are used by the hosts to control the flow of data into and out of the data storage media. Power supply to the input/output units and the data storage media themselves is important to ensure operation of the data storage system.

In data storage systems it is desirable to provide high availability, i.e. an approach and associated service implementation that ensures a prearranged level of operational performance will be met during a defined period. In the area of data storage systems this is typically achieved by building redundancy into the power supply of the product. It is not uncommon for current systems to be designed and built with at least two power supplies. Thus, if one was to fail, a backup power supply is available.

In our co-pending patent application entitled "Auxiliary Power Supply, a Method of Providing Power to a Data Storage System and A Back-up Power Supply Charging Circuit", having number U.S. Ser. No. 61/245,466 and being filed on 24 Sep. 2009, there is disclosed a data storage system with a power supply system. The power supply system includes two independent power supplies together with an auxiliary power supply system arranged to still provide power in the event of a total AC power failure.

Considering as an example of a system with 2 power supplies (a redundancy model of 1+1) the load of the power supplies or their output will be shared between them. Research shows that in use the average power provided to each module, i.e. whatever is being powered by the power supply, is usually less than 15% of the rated power of each of the two power supplies. This can be inefficient as efficiency of a power supply tends to increase with output, at least up to a certain level. One way this can be addressed is the use of a cold redundancy model whereby despite the presence of two power supplies in the system overall, power is drawn from only one when this is the most efficient way of powering the system.

The efficiency curve of a typical power supply including 2 independent power supply units is shown in FIG. 1. This shows the variation in efficiency of the power supply as the power it supplies varies. As can be seen, at lower powers (x) the efficiency (b) of the non-redundant system is higher than that (a) of a system in which power load is shared between the two power supply units. Thus, at lower power levels, the data storage system is powered most efficiently by the use of a cold redundant system, i.e. a system in which power for the system is drawn only from one of the two independent power supplies, the other one of the two being "cold".

However, as the power levels increase, there comes a point at which the efficiency curves cross, such that higher efficiency is achieved by the use of redundant power supplies. In other words, the power load is shared between the two independent power supplies. At power levels as high as those represented by "y" on the graph of FIG. 1, higher efficiency (d) is achieved by sharing the power load between the two power supply units. At this power level (y), if all power were to be drawn from a single one of the two independent power supplies, the efficiency would be at a lower level (c).

Thus, the concept of power cold redundancy is to only actively use one of the two power supplies (1+0) where the efficiency curve shows that this is the most efficient way of providing the required power. When the output power requirement increases so that the efficiency of providing the power from a single power source starts to tail off and crosses the efficiency curve for a redundant 1+1 power supply, the redundant power supply is powered on too. This is shown clearly in FIG. 1 as explained above. At the point 6 where the solid line 2 crosses the dashed and dotted line 4, the $2^{nd}$ power supply is powered on so that the efficiency of the power delivered to the system follows the dashed and dotted line 4.

FIG. 2 shows the same graph with an extra line 8 to represent the resultant power/efficiency curve for the system when following this cold redundancy model.

In a system that has 4 power supplies (2+2 redundancy) the same concepts can be used whereby only one power supply is used and more are added as either, the efficiency curve dictates or the power requirement is greater than that of a single power supply.

Although cold redundancy can work well, in some cases a problem arises. The problem arises in particular in areas where the avoidance of down time is critical, such as in the power supply of a data storage system. If power is lost to the system, data can be lost which is clearly undesirable. Using a cold redundant power supply arrangement, i.e. running a system on a single supply so as to operate at a position of higher efficiency, is dangerous, since the single power supply can fail, and when it does, data can be lost.

Either the power supply itself can fail or the AC source providing power to it fails. It is in this scenario, with hot redundancy, that the second power supply (fed from a different AC source) would continue to operate. However, by definition, with cold redundancy the other power supply needs to kick in and provide power in a very quick period of time. Typically, once power supply to a power supply unit fails, the PSU holdup is around 5-20 ms. In other words, within this short window, the second power supply must be switched on and be up and running.

Thus, the use of simple cold redundancy, although offering benefits in terms of efficiency (as explained above with reference to FIGS. 1 and 2), has serious risks associated with power failure. One way by which the serious risks can be mitigated is by the use of a fault detector circuit and implementing special logic within the power delivery system to ensure quick power-on of the other power supply. However this is a complex solution and can add significant cost to the system.

US-A-2010/00052426 discloses a power supply system including at least one power supply module and at least one redundant power supply module. The power supply module may include a charging resistor in parallel with an OR-ing device to keep all filter capacitors charged as long as at least one power supply module remains operational. Thus, current spikes at turn on may be avoided and the redundant module is enabled to be turned on without using soft start.

According to a first aspect of the present invention, there is provided a power supply system for a data storage system, the power supply system comprising: a first power supply unit for supplying power to the storage system; a second power supply unit independent from the first power supply unit for supplying power to the storage system; an auxiliary power supply; a power redundancy controller, arranged to monitor the region of an efficiency curve within which the first and/or second power supplies are operating in and control the first and second power supplies accordingly such that the either or both of the first and second power supplies are providing power at any one time, wherein in the event of failure of a power supply unit when only one of the power supply units is operating, the power redundancy controller is arranged to ensure or provide power supply to the data storage system from the auxiliary power supply.

Thus, a power supply system is provided that is able to operate for a data storage system using cold redundancy, i.e. in which two power supply units are provided but power at times is drawn only from one of them so as to maximise efficiency, the other being in an "off" or "standby" state. Whereas previously, the risk of damage to the data within the data storage system made the use of such cold redundancy impractical, the present system provides an auxiliary power supply and a power redundancy controller. The power redundancy controller serves to ensure that power is provided to the data storage system from the auxiliary power supply if the active power supply fails whilst the second, inactive power supply unit, is started. The benefits of cold redundancy can therefore be effectively and safely realised.

In one embodiment, the auxiliary power source is a battery formed as part of the first and/or second power supply units.

In one embodiment, the auxiliary power source is a battery formed as an independent unit, separate from the first and/or second power supply units.

In one embodiment, the battery is a rechargeable battery and is arranged to be charged by power from the first and/or second power supply units during normal operation thereof.

In one embodiment, the auxiliary power source is an uninterruptible power supply. Whereas, it is envisaged that in embodiments, the auxiliary power supply would be a battery or battery pack, it is advantageous that in fact any uninterruptible power supply may be used as the auxiliary power source and provide the same benefits.

According to a second aspect of the present invention, there is provided a method of control of power supply to a data storage system comprising a data storage medium, first and second power supply units arranged to provide power to the data storage system, an auxiliary power supply for the data storage system, and a power redundancy controller, the method comprising: monitoring the efficiency of the power supply to the data storage system using the power redundancy controller and selectively activating and/or deactivating one or both of the first and second power supply units so as to ensure that power is provided whilst maximising efficiency; wherein in the event of failure of a power supply unit when only one of the first and second power supply units is operating, supplying power to the data storage system from the auxiliary power supply.

According to a third aspect of the present invention, there is provided a data storage system, comprising: one or more data storage media; a power supply system for providing power to the data storage system, wherein the power supply system is a power supply system according to the first aspect of the present invention.

In one aspect, there is provided a redundant power supply system for a data storage system, the power supply system comprising: a first power supply for supplying power to the storage system; a second power supply independent from the first power supply for supplying cold redundant power to the storage system; an auxiliary power supply; a control unit, arranged to monitor the region of an efficiency curve within which the first and/or second power supplies are operating in and control the first and second power supplies accordingly such that the either or both of the first and second power supplies are providing at any one time, wherein in the event of failure of a power supply when only one of the power supplies is operating, the auxiliary power supply is arranged automatically to provide power to the data storage system.

Thus, the use of an independent auxiliary power supply as well as the two main power supplies of a data storage system enables cold redundancy to be used such that a data storage system can be powered in a way that maximises the efficiency of the power supply. This can be achieved without the use of or need for a fault detector circuit and the implementation of special logic within the power delivery system to ensure quick power-on of the other power supply in the event of failure of the first. The complexity and associated cost of this solution can therefore be avoided whilst providing the same benefits of higher efficiency across the load range of the system.

Embodiments of the present invention will now be described in detail with reference to the accompanying drawings, in which.

Figure 1:
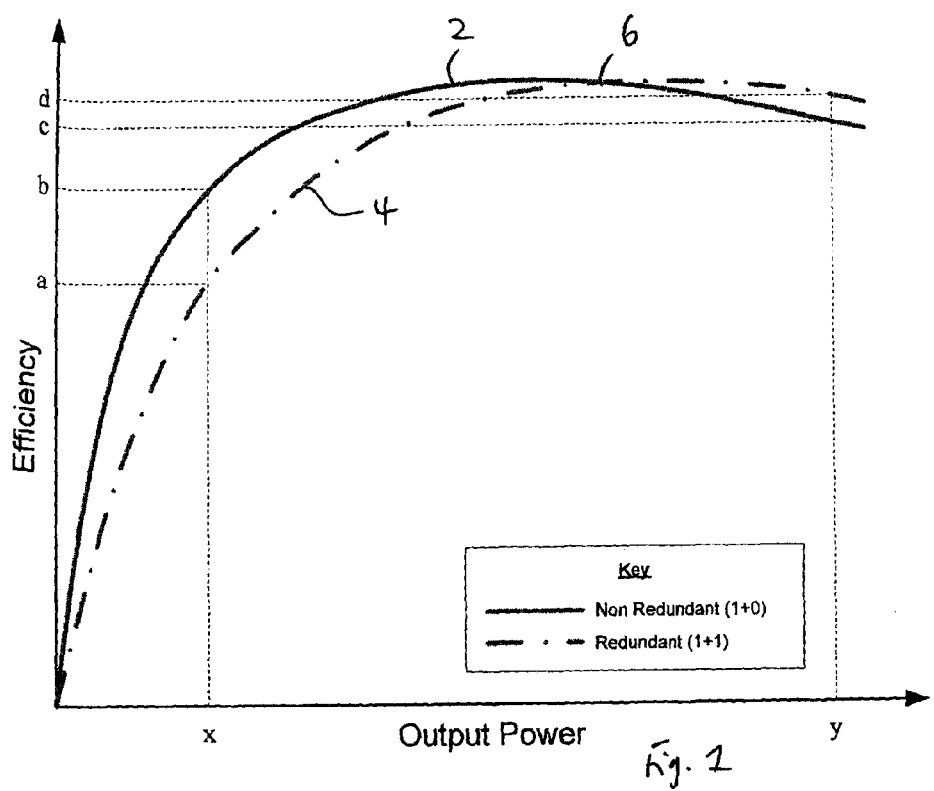
FIGS. 1 and 2 show the efficiency curve of a power supply including 2 independent power supply units.
Figure 2:
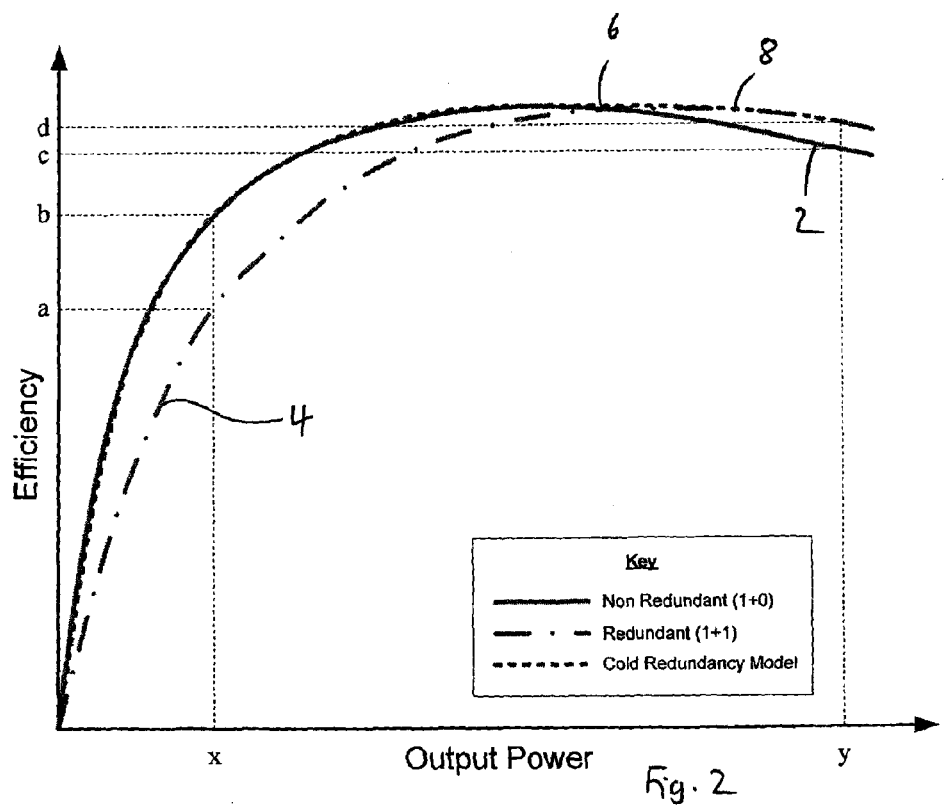
Figure 3:
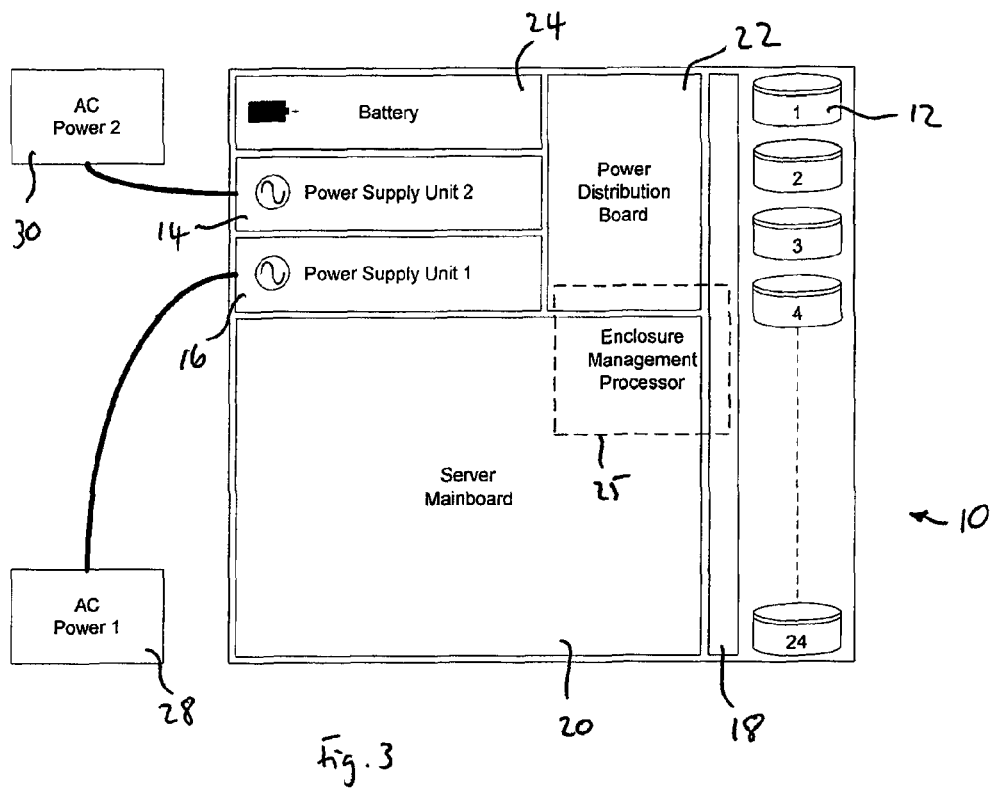
FIG. 3 is a schematic representation of a data storage system including two independent power supply units.

As explained above with reference to FIGS. 1 and 2, the use of an auxiliary power supply enables a cold-redundancy model to be achieved in powering a data storage system by removing the risk of data loss in the event of power failure when the system is being powered by a single power supply unit. FIG. 3 is a schematic representation of a data storage system including two independent power supply units and which is controlled and arranged to operate in accordance with a cold redundancy model.

Referring to FIG. 3, the data storage system 10 comprises plural storage media 12. The storage media 12 may be any suitable type of storage media. Typically, they will be hard disk drives.

The storage system 10 includes two independent power supply units 14 and 16 arranged to provide power independently to the system 10 including the storage media 12. A midplane 18 is provided that serves as a connection between the disk drives 12 and input/output units (not shown) on the server main board 20. In addition, a power distribution board 22 is provided arranged to receive power from the power supply units 14 and 16 and distribute the power accordingly to components both on the server main board 20 and the disk drives 12 themselves.

An auxiliary power supply 24 is also provided in the form of a battery. The battery could be any suitable form of battery and typically would be a rechargeable battery arranged to be charged during normal operation of the system, i.e. when power is being supplied via one or both of the power supply units 14 and/or 16. The battery 24 acts as an uninterruptible power supply. What this means is that the system can safely operate in a "cold redundant" manner and, when a power supply fails, the UPS or battery 24 is able to hold up the system for many seconds which is sufficient time to allow the cold redundant power supply to be powered on via enclosure management software and hardware, to be described in greater detail below. This therefore allows the use of existing power supplies and power distribution circuits without the need for special logic and allows for fast switchover from a failed power supply unit to the redundant power supply unit.

The use of an auxiliary power supply 24 ensures that in the event of failure of a power supply unit when only one of the power supply units is operating (so as to maximise efficiency), the data storage system can be held up until the second power supply unit can be switched on.

Enclosure management software would typically be provided to manage operation of the system 10. The enclosure management software, which would typically be running on an enclosure management processor 25, serves to monitor the entire enclosure including the power requirements of the system and turn on or off the power systems accordingly to ensure that maximum efficiency is obtained for a given output power level. The enclosure management processor can be provided on the server main board 20 or alternatively on an alternative board (not shown). The enclosure management processor and software can be provided in any suitable form. Examples include ASICs and/or FPGAs. In other words, the enclosure management software and processor is arranged to monitor the power status of the system 10 and turn on and off the power supply units 14 and 16 as necessary to achieve optimum power efficiency.

When only a single one of the power supply units 14 and 16 is operating and there is a failure of that unit, the enclosure management software and processor, which may be thought of in combination as a power redundancy controller, detects this and switches to the auxiliary power source 24 until the other power supply 14 or 16 can be started up. Thus, the benefits of cold redundancy can be achieved in a cost-effective and convenient manner whilst the potential drawbacks discussed above are avoided.

Figure 4:
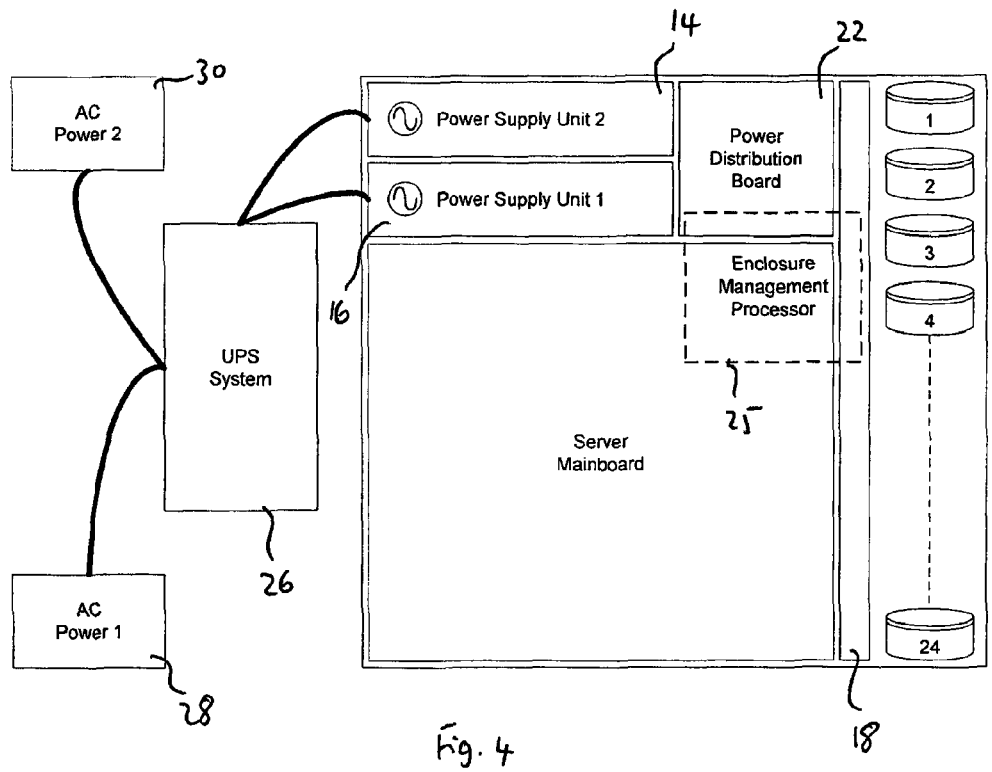
FIG. 4 is a schematic representation of a data storage system including two independent power supply units.

FIG. 4 shows a schematic representation of an alternative, more generic, system. In this case, instead of providing an auxiliary power source 24 within the data storage system, a more general UPS system 26 is provided. The UPS system 26 receives power from external AC power sources 28 and 30 and provides power accordingly to the power supply units 14 and 16. Again, when the power redundancy controller, e.g. the enclosure management processor and software (not shown), detects that maximum efficiency can be obtained in a cold redundant mode, power will be drawn from only one of the power supply units 14 and 16. If the selected single one of the power supply units then fails, the power redundancy controller serves to draw power from the UPS system 26 to ensure that the storage media and the system 10 in general will be powered whilst the other of the power supply units is switched on. In an embodiment, a hardware interface is provided between the power redundancy controller and the power supply units 14 and 16, to enable the power redundancy controller to switch the power supply units on and off, as required.

As described above, the system described in our co-pending application U.S. Ser. No. 61/245,466 can be modified so as to operate in accordance with the present power supply system. To do this, a power redundancy controller e.g. in the form of an enclosure management processor, is required to monitor the region of an efficiency curve within which the first and/or second power supply units are operating, and control the power supplies accordingly and also, to detect, when only one of the power supply units is operating, if there is a power failure and, in such a situation, to switch to the auxiliary power supply.

In one embodiment, the power redundancy controller serves also to monitor the state of the UPS source. If it is detected that it has lost some of its capability then it is ensured that both (or, if there are more than two: more than one of the) power supply units are switched on until UPS, e.g. the battery source, has been replenished. In one particular example, the detecting might comprise monitoring the power output or charge level of the battery source and detecting if it falls below some defined threshold. Thus, an additional level of control is provided that ensures that the data storage system is safely powered so that the risk to data due to a failure of one of the power supply units is minimised.

It will be appreciated that the auxiliary power supply can be provided as a part of the main power supply units 14 and 16 or as a separate independent component. In either case the auxiliary power supply operates independently from the power supply units. Where it is provided separately from the power supply units then a single auxiliary power supply may be provided since its role is merely to provide power when there is a failure of the power supply unit and it is operating in a cold redundant mode. If the auxiliary power supply is provided as part of the main power supply units 14 and 16 then an auxiliary power supply is preferably provided within each of the power supply units 14 and 16 for any particular data storage system 10.

Figure 5:
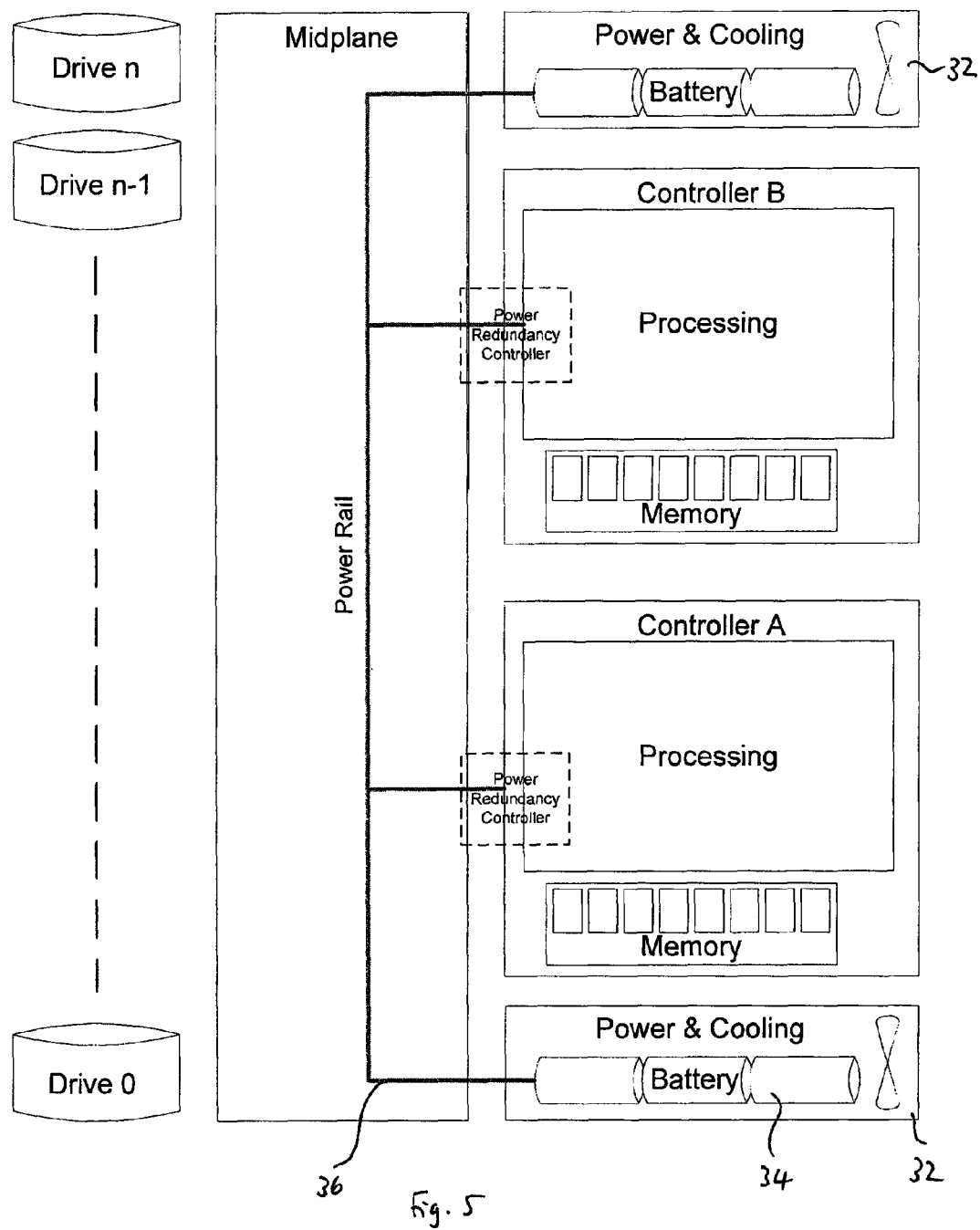
FIG. 5 is a schematic representation of a data storage system including two independent power supplies.

In the system described in U.S. Ser. No. 61/245,466, there are embodiments in which the auxiliary power supply unit is provided within the main power supply units and also in which it is provided separately from the main power supply units. FIG. 5 is a representation of FIG. 2A from U.S. Ser. No. 61/245,466. As can be seen, two power supply units are shown 32. Each is provided with an auxiliary power supply unit 34 in the form a rechargeable battery. A power rail 36 is provided through which power may be transferred to the controllers which function as input/output units. To provide the present advantages, a power redundancy controller is included so as to determine whether or not only one of the power supply units 32 should be switched on or if indeed both should so as to ensure maximum efficiency in the delivery of power. Where only one is switched on and there is a power failure from that supply unit, then the other will be switched on and whilst this is taking place power is supplied to the power rail 36 from the auxiliary power supply unit 34.

Figure 6:
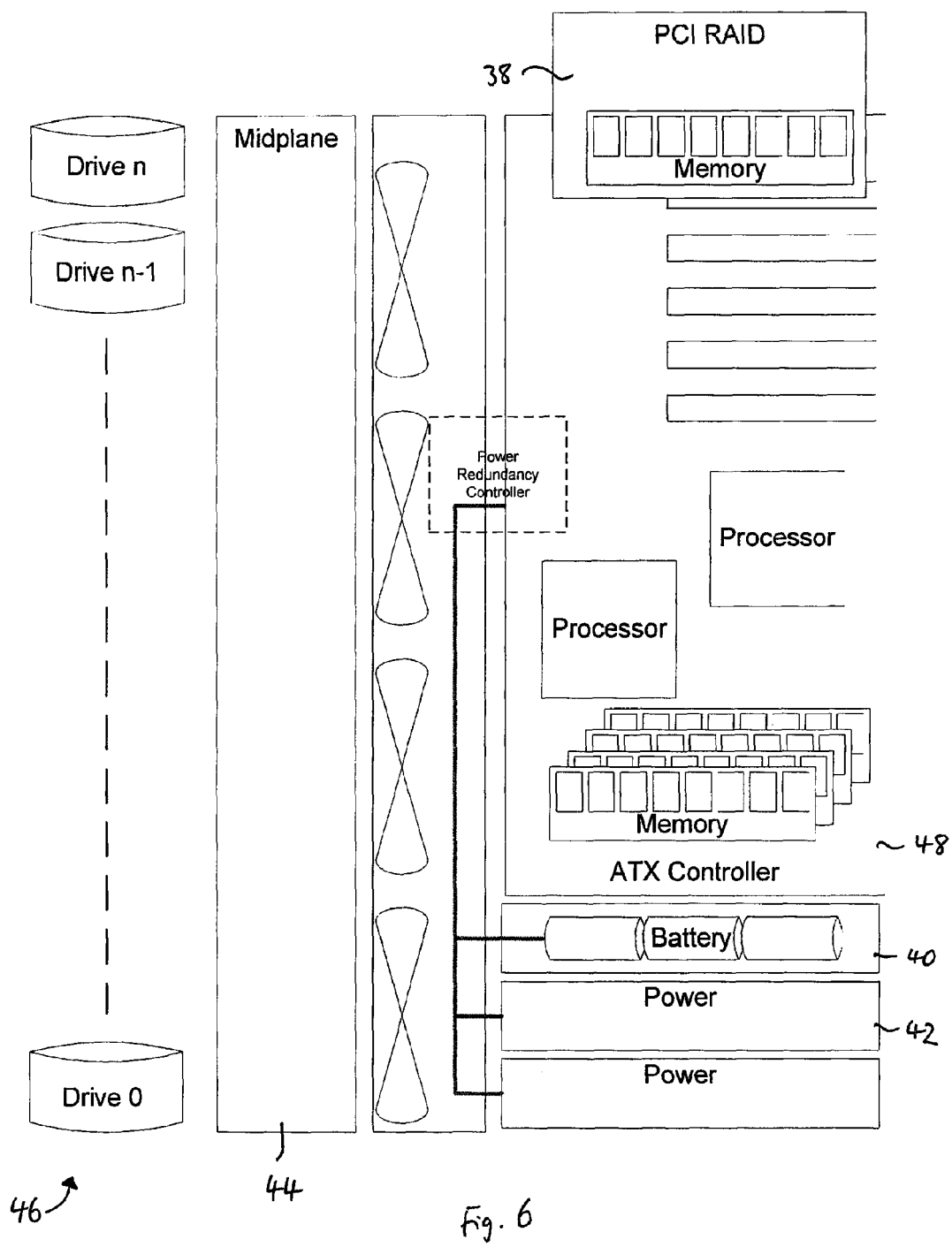
FIG. 6 is a schematic representation of a data storage system including two independent power supplies.

FIG. 6 corresponds to FIG. 2B from U.S. Ser. No. 61/245,466. In this example, the overall system is an ATX-based RAID system. A PCI raid card 38 is provided. An auxiliary power supply 40 is provided separately from the power supply units 42. Other features of the system of FIG. 6 will not be described in detail. However, the skilled person will recognise the presence of a midplane 44 and plural drives 46 and the ATX controller 48.

Figure 7:
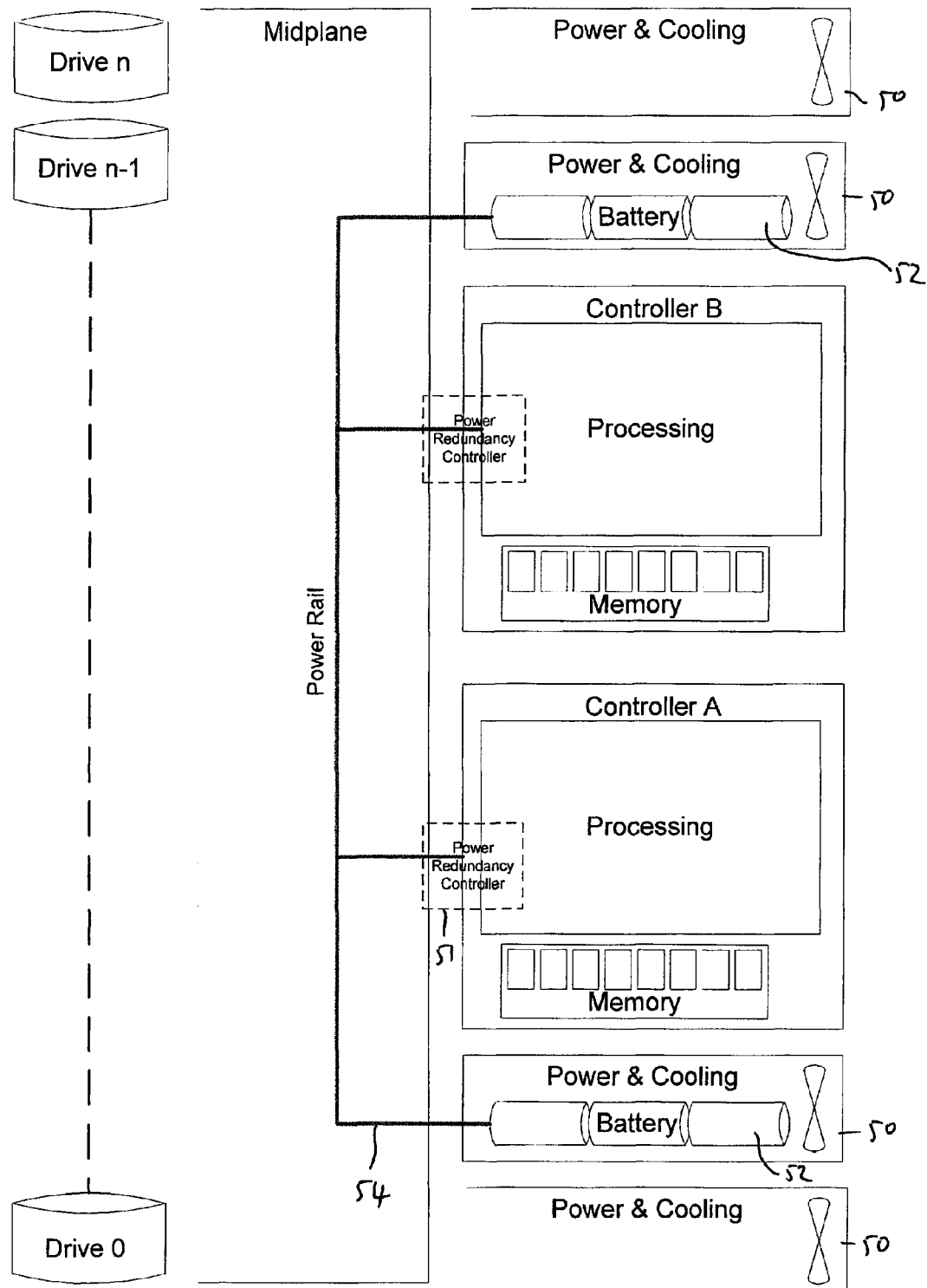
FIGS. 7 to 9 are schematic representation of a data storage system including plural independent power supplies.
Figure 8:
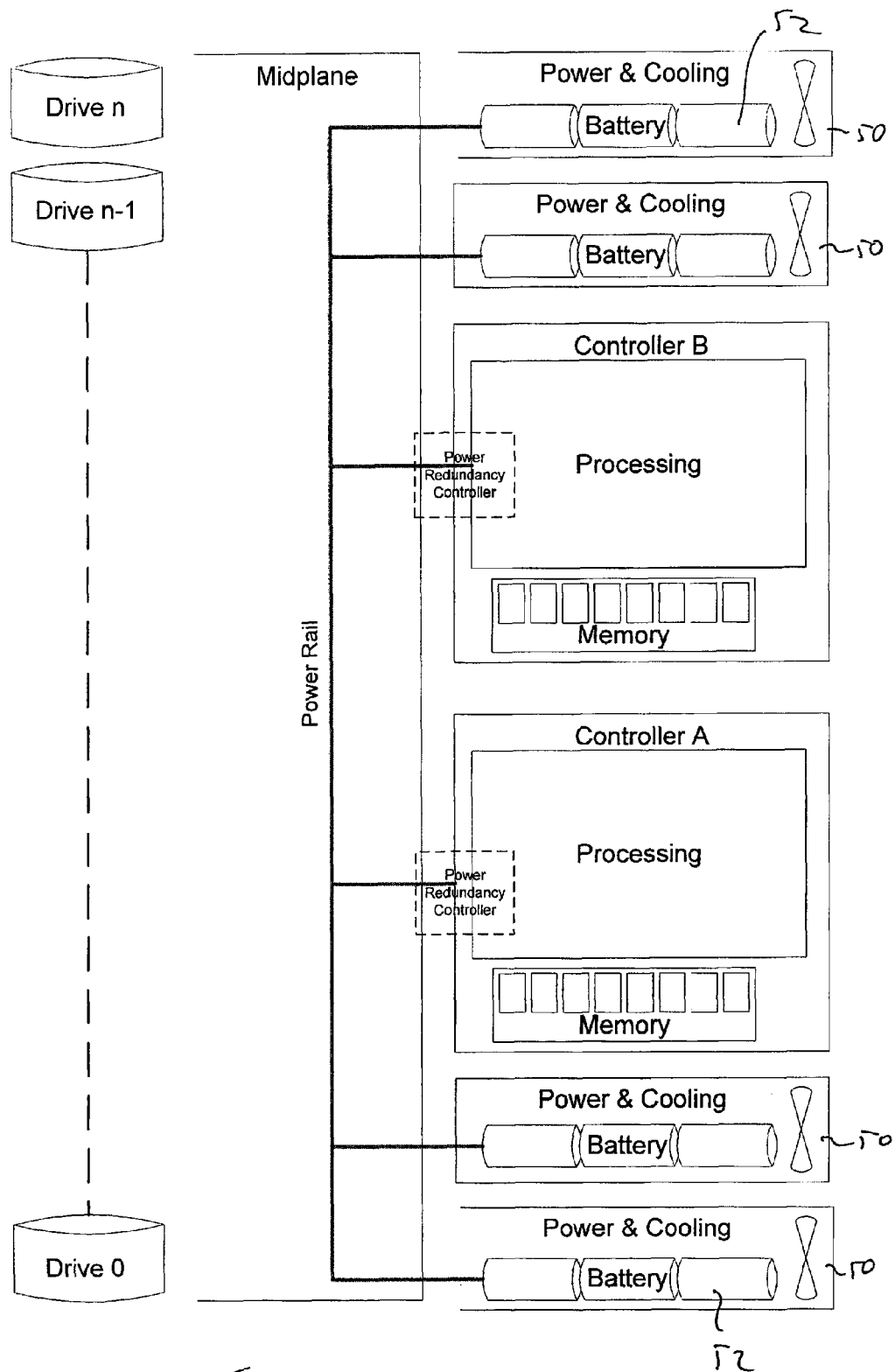
Figure 9:
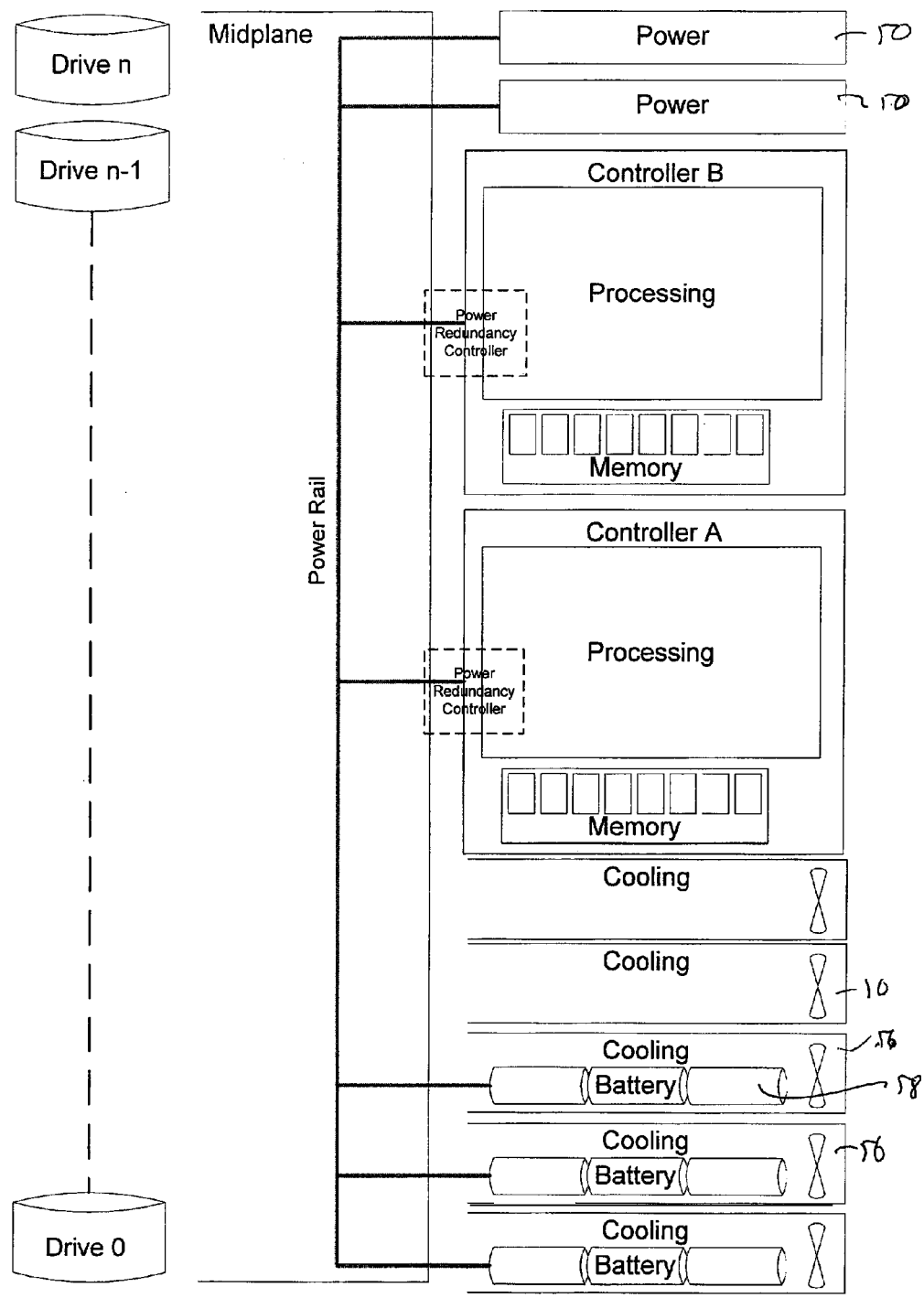

FIGS. 7 to 9 are schematic representation of a data storage system including plural independent power supplies. In all cases in these figures more than 2 independent power supplies are provided.

Referring to FIG. 7, four independent power supply units 50 are provided. The power supply units 50 also include cooling capability in the form of fans. As can be seen, two of the four power supply units 50 include auxiliary power supplies 52 in the form of batteries. As in the examples of FIGS. 5 and 6, a power rail is provided through which power is distributed throughout the storage system. In normal use the auxiliary power supplies 52 can be rechargeable batteries arranged to be charged up via the power rail. It will be appreciated that in general what is disclosed is a data storage system in which plural power systems in which all or only some of the plural power supply units 50 are provided with auxiliary power supplies.

One or more power redundancy controllers 51 are provided. As explained above, the power redundancy controllers 51 serve to monitor the region of an efficiency curve within which the power supply unit(s) is (are) operating, and control the power supply units accordingly and also, to detect, when only one of the power supply units is operating, if there is a power failure and, in such a situation, to switch to the auxiliary power supply.

FIG. 8 shows a data storage system similar to that of FIG. 7, except that in this case each and everyone of the plural power supply units 50 is provided with a corresponding auxiliary power supply 52.

In the example of FIG. 9, auxiliary power supplies 58 are provided within temperature control units, such as fan units 56. In this case, the power supply units are separate from the fan units 56. In particular, in this example, there are provided 2 power supply units 50 and 5 fan (cooling) units 56. Typically, each of the auxiliary power supplies 58 includes 3 rechargeable batteries and an auxiliary power supply is provided within 3 of the fan units/modules.

Embodiments of the present invention have been described with particular reference to the examples illustrated. However, it will be appreciated that variations and modifications may be made to the examples described within the scope of the present invention.

The invention claimed is:

1. A power supply system for a data storage system, the power supply system comprising:
    a first power supply unit for supplying power to the storage system;
    a second power supply unit independent from the first power supply unit for supplying power to the storage system;
    an auxiliary power supply;
    a power redundancy controller, arranged to monitor the region of an efficiency curve within which the first and/or second power supplies are operating and control the first and second power supplies accordingly such that the either or both of the first and second power supplies are providing power at any one time, wherein
    in the event of failure of a power supply unit when only one of the power supply units is operating, the power redundancy controller is arranged to ensure power supply to the data storage system from the auxiliary power supply.

2. A power supply system according to claim 1, in which the auxiliary power supply is a battery formed as part of the first and/or second power supply units.

3. A power supply according to claim 2, in which the battery is a rechargeable battery and is arranged to be charged by power from the first and/or second power supply units during normal operation thereof.

4. A power supply system according to claim 1, in which the auxiliary power supply is a battery formed as an independent unit, separate from the first and/or second power supply units.

5. A power supply according to claim 1, in which there are provided 3 or more independent power supply units.

6. A power supply according to claim 1, in which the power redundancy controller is controlled to monitor the state of the auxiliary power source.

7. A power supply according to any of claim 6, in which if it is detected that the auxiliary power source has lost some of its capability then two or more of the power supply units are switched on.

8. A power supply system according to claim 1, in which the power supply system is an integrated power supply system within a data storage system.

9. A data storage system, comprising:
    one or more data storage media;
    a power supply system for providing power to the data storage system, wherein the power supply system is a power supply system according to claim 1.

10. A data storage system according to claim 9, wherein the power supply system is integrated within the data storage system.

11. A method of control of power supply to a data storage system comprising a data storage medium, first and second power supply units arranged to provide power to the data storage system, an auxiliary power supply for the data storage system, and a power redundancy controller, the method comprising:
    monitoring the efficiency of the power supply to the data storage system using the power redundancy controller and selectively activating and/or deactivating one or both of the first and second power supply units so as to ensure that power is provided whilst maximising efficiency;
    wherein in the event of failure of a power supply unit when only one of the first and second power supply units is operating, supplying power to the data storage system from the auxiliary power supply.

12. A method according to claim 11, in which the auxiliary power supply comprises a rechargeable battery, the method comprising, during normal operation of the power supply units charging or recharging the auxiliary under control of the power redundancy controller.

* * * * *